United States Patent
Furuhata

(10) Patent No.: US 9,765,206 B2
(45) Date of Patent: Sep. 19, 2017

(54) RUBBER COMPOSITION FOR CONVEYOR BELTS, RUBBER FOR CONVEYOR BELT COVERS, AND CONVEYOR BELT

(71) Applicant: BRIDGESTONE CORPORATION, Chuo-ku, Tokyo (JP)

(72) Inventor: Yosuke Furuhata, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 478 days.

(21) Appl. No.: 14/371,917

(22) PCT Filed: Jan. 11, 2013

(86) PCT No.: PCT/JP2013/050448
§ 371 (c)(1),
(2) Date: Jul. 11, 2014

(87) PCT Pub. No.: WO2013/105655
PCT Pub. Date: Jul. 18, 2013

(65) Prior Publication Data
US 2015/0005433 A1    Jan. 1, 2015

(30) Foreign Application Priority Data

Jan. 13, 2012    (JP) ................................. 2012-005318

(51) Int. Cl.
| | | |
|---|---|---|
| *C08L 9/06* | (2006.01) | |
| *C08K 3/04* | (2006.01) | |
| *C08K 3/36* | (2006.01) | |
| *B29D 29/06* | (2006.01) | |
| *C08L 93/04* | (2006.01) | |
| *C08L 91/06* | (2006.01) | |

(52) U.S. Cl.
CPC ................ *C08L 9/06* (2013.01); *B29D 29/06* (2013.01); *C08K 3/04* (2013.01); *C08K 3/36* (2013.01); *C08L 91/06* (2013.01); *C08L 93/04* (2013.01); *C08L 2205/025* (2013.01); *C08L 2205/03* (2013.01); *C08L 2205/035* (2013.01)

(58) Field of Classification Search
CPC . C08L 9/06; C08L 2205/025; C08L 2205/035
See application file for complete search history.

(56) References Cited

U.S. PATENT DOCUMENTS

| | | |
|---|---|---|
| 4,963,615 A | 10/1990 | Yuto |
| 5,432,232 A | 7/1995 | Hattori et al. |
| 2002/0132903 A1 | 9/2002 | Hiramitsu |
| 2011/0294936 A1 | 12/2011 | Sato |

FOREIGN PATENT DOCUMENTS

| | | |
|---|---|---|
| CN | 1367198 A | 9/2002 |
| EP | 2 072 280 A1 | 6/2009 |
| EP | 2 366 557 A1 | 9/2011 |
| JP | 2-129240 A | 5/1990 |
| JP | 364336 A | 3/1991 |
| JP | 6-65419 A | 3/1994 |
| JP | 2000-198517 A | 7/2000 |
| JP | 2006-199892 A | 8/2006 |
| JP | 2010-6859 A | 1/2010 |
| JP | 2010-126671 A | 6/2010 |
| JP | 2011-236025 A | 11/2011 |
| WO | 2010/122977 A1 | 10/2010 |

OTHER PUBLICATIONS

International Search Report of PCT/JP2013/050448, dated Feb. 5, 2013.
Communication dated Sep. 15, 2015, issued by the European Patent Office in corresponding European Application No. 13736089.7.
Database WPI, Week 201039, Thomson Scientific, 2010, London, GB, AN 2010-G44171, XP-002742827 (1 page).
Communication dated May 21, 2015 from the State Intellectual Property Office of People's Republic of China in counterpart Application No. 201380013505.5.

*Primary Examiner* — Ling Choi
*Assistant Examiner* — Thuy-Ai N Nguyen
(74) *Attorney, Agent, or Firm* — Sughrue Mion, PLLC

(57) ABSTRACT

Rubber composition for conveyor belts containing (A) a rubber component that contains a styrene-butadiene rubber mixture having a mean styrene content of from 28 to 35% by mass, which contains one or more types of styrene-butadiene rubber having a styrene content of from 20 to 25% by mass and one or more types of styrene-butadiene rubber having a styrene content of from more than 25 to 50% by mass, and at least one selected from butadiene rubber and natural rubber in a specific ratio, (B) silica, (C) resin, and (D) specific carbon black in a specific ratio; a rubber for conveyor belt covers, formed by using the rubber composition; and a conveyor belt cover provided by using the rubber composition.

11 Claims, No Drawings

RUBBER COMPOSITION FOR CONVEYOR BELTS, RUBBER FOR CONVEYOR BELT COVERS, AND CONVEYOR BELT

CROSS REFERENCE TO RELATED APPLICATIONS

This application is a National Stage of International Application No. PCT/JP2013/050448 filed Jan. 11, 2013, claiming priority based on Japanese Patent Application No. 2012-005318, filed Jan. 13, 2012, the contents of all of which are incorporated herein by reference in their entirety.

TECHNICAL FIELD

The present invention relates to a rubber composition for conveyor belts, a rubber for conveyor belt covers using the composition, and a conveyor belt. More precisely, the present invention relates to a rubber composition for conveyor belts, which is useful as a rubber for an upper cover of a conveyor belt comprising an upper cover rubber, a reinforcing material and a lower cover rubber, to a rubber for conveyor belt covers formed by using the rubber composition, and to a conveyor belt provided by using the rubber composition.

BACKGROUND ART

A conveyor belt is extremely useful as a means for transporting articles, and is used in many places.

The conveyor belt comprises generally an upper cover rubber, a reinforcing material and a lower cover rubber. In particular, the upper cover rubber may be readily worn by the friction against the object mounted thereon to be conveyed, and, for example, when given an impact by the corner of the object to be conveyed, there is a fear that the upper cover rubber may be cracked. Consequently, for the purpose of prolonging the life of the entire belt, it is necessary to satisfy both wear resistance and cutting resistance.

Of the above-mentioned performances, for improving the cutting resistance and the impact resistance, there is disclosed a rubber composition for conveyor belt covers, which contains from 45 to 65 parts by mass of carbon black having a nitrogen adsorption specific surface area of 100 $m^2/g$ or more and a DBP oil absorption of 100 $cm^3/100$ g or more, from 5 to 20 parts by mass of silica, and from 2 to 7 parts by mass of resin, relative to 100 parts by mass of rubber therein having a blend ratio (by mass) of natural rubber to styrene-butadiene rubber of from 50/50 to 80/20 (see PTL 1). However, the rubber composition is still unsatisfactory in point of wear resistance.

Contrary to this, for satisfying both wear resistance and cutting resistance, there is disclosed a rubber composition for conveyor belts, which contains, relative to (A) 100 parts by mass of a rubber component therein containing from 90 to 60 parts by mass of styrene-butadiene rubber and from 10 to 40 parts by mass of butadiene rubber and/or natural rubber, (B) from 50 to 70 parts by mass of carbon black having a nitrogen adsorption specific surface area of 100 $m^2/g$ or more and (C) from 10 to 30 parts by mass of a resin (see PTL 2). The rubber composition could be improved in some degree in point of both the impact resistance and the cutting resistance thereof, but there is still room to improve the cutting resistance, and moreover, the rubber composition has another problem in that the production workability thereof is poor.

CITATION LIST

Patent Literature

Patent document 1: JP2000-198517 A
Patent document 2: JP2006-199892 A

SUMMARY OF INVENTION

Technical Problem

Given the situation as above, an object of the present invention is to provide a rubber composition for conveyor belts, which satisfies both cutting resistance and production workability without worsening the wear resistance thereof, and further to provide a rubber for conveyor belt covers formed by using the rubber composition and a conveyor belt provided by using the rubber composition.

Solution to Problem

The present inventors have assiduously studied for the purpose of solving the above-mentioned problems and, as a result, have found that when SBR having a specific mean styrene content, which is prepared by mixing two or more types of SBRs that differ in point of the styrene content thereof, is used, then the above-mentioned problems can be solved. The present invention has been completed on the basis of these findings.

Specifically, the present invention relates to the following [1] to [4].

[1] A rubber composition for conveyor belts, which contains, relative to (A) 100 parts by mass of a rubber component therein containing from 100 to 70 parts by mass of styrene-butadiene rubber and from 0 to 30 parts by mass of at least one selected from butadiene rubber and natural rubber, (B) from 5 to 20 parts by mass of silica, (C) from 10 to 30 parts by mass of resin, and (D) from 40 to 70 parts by mass of carbon black having a nitrogen adsorption specific surface area, which is measured according to JIS K 6217-2:2001 (the same shall apply hereinunder), and wherein the styrene-butadiene rubber is a styrene-butadiene rubber mixture having a mean styrene content of from 28 to 35% by mass, which contains one or more types of styrene-butadiene rubber having a styrene content of from 20 to 25% by mass and one or more types of styrene-butadiene rubber having a styrene content of from more than 25 to 50% by mass.

[2] The rubber composition for conveyor belts according to the above [1], wherein the styrene-butadiene rubber mixture contains from 40 to 70% by mass of styrene-butadiene rubber having a styrene content of from 20 to 25% by mass and from 30 to 60% by mass of styrene-butadiene rubber having a styrene content of from more than 25 to 50% by mass.

[3] A rubber for conveyor belt covers, formed by using the rubber composition of the above [1] or [2].

[4] A conveyor belt provided by using the rubber composition of the above [1] or [2].

Advantageous Effects of Invention

According to the present invention, there are provided a rubber composition for conveyor belts, which satisfies both cutting resistance and production workability without worsening the wear resistance thereof, and further a rubber for conveyor belt covers formed by using the rubber composition and a conveyor belt provided by using the rubber composition.

DESCRIPTION OF EMBODIMENTS

In this specification, the preferred descriptions can be employed arbitrarily and can be combined arbitrarily. Combinations of preferred descriptions can be said to be more preferred.

In the present invention, as styrene-butadiene rubber (hereinafter referred to as SBR), employed is an SBR mixture containing one or more types of SBRs having a styrene content of from 20 to 25% by mass (preferably from 22 to 25% by mass) and one or more types of SBRs having a styrene content of from more than 25 to 50% by mass (preferably from 30 to 50% by mass, more preferably from 40 to 50% by mass). The mean styrene content in the SBR mixture is from 28 to 35% by mass, preferably from 30 to 35% by mass.

Using the SBR mixture of the type, the rubber composition satisfies both cutting resistance and production workability without worsening the wear resistance thereof.

The SBR mixture may contain one or more types of SBRs having a styrene content not falling within the above two specific ranges, as long as it has a mean styrene content falling within the above range. However, the SBR mixture preferably contains from 40 to 70% by mass of SBR having a styrene content of from 20 to 25% by mass, and from 30 to 60% by mass of SBR having a styrene content of more than 25 to 50% by mass, from the viewpoint of the rubber properties such as the wear resistance and the cutting resistance and of the workability of the rubber composition.

As SBR, any of emulsion-polymerized SBR and solution-polymerized SBR is employable. Also usable are commercial products, and for example, as emulsion-polymerized SBR, there are mentioned JSR 1500, JSR 1502, JSR 1712 (all having a styrene content of 23.5% by mass), JSR 0122 (styrene content 37% by mass), JSR 0202 (styrene content 46% by mass) (all by JSR), etc.; and as solution-polymerized SBR, there are mentioned SL 552 (styrene content 24% by mass), SL 555 (styrene content 24% by mass), SL 556 (styrene content 24% by mass), SL 574 (styrene content 15% by mass) (all by JSR), etc.

As butadiene rubber (hereinafter referred to as BR), usable here is BR produced through polymerization with a nickel-based catalyst, for example, BR 01 and BR 11 (both by JSR), or BR produced through polymerization with a lithium-based catalyst, for example, BR 71 (by JSR). Preferred is butadiene rubber produced through polymerization with a neodymium-based catalyst (hereinafter referred to as Nd—BR). Here, the double bond moiety in BR includes a cis form and a trans form. In Nd—BR for use in the present invention, preferably, the cis form accounts for 80% or more, more preferably 90% or more. This is because, when the cis form accounts for less than 80%, the wear resistance of the rubber composition may be poor.

Various types of neodymium-based catalysts are known, and neodymium-containing compounds as well as their reaction products with a Lewis base and the like are usable here. Concretely, preferred are carboxylates, phosphates, phosphites, alkoxides and the like with neodymium.

As a co-catalyst, preferred is use of aluminoxanes, and methylaluminoxane is especially preferred.

Nd—BR is preferably terminal-modified. For terminal modification of Nd—BR, there may be employed a method of modifying the active terminal of Nd—BR using a modifying agent. Examples of the modifying agent include tin halides such as tin tetrachloride, tin tetrabromide, etc.; halogenated organic tin compounds such as tributyltin chloride, etc.; silicon compounds such as silicon tetrachloride, chlorotriethylsilane, etc.; isocyanate group-containing compounds such as phenyl isocyanate, etc.; amide compounds, lactam compounds, urea compounds, isocyanuric acid derivatives, etc. Of those, especially preferred is use of tin compounds for terminal modification. Of the terminal-modified Nd—BR for use in the present invention, the molecular weight is not specifically defined.

The rubber component of the component (A) contains from 100 to 70 parts by mass of SBR, and from 0 to 30 parts by mass of at least one selected from BR and natural rubber. In the component (A), when the SBR content is less than 70 parts by mass, then the cutting resistance lowers.

The rubber component may contain a small amount (for example, preferably 10 parts by mass or less, more preferably 5 parts by mass or less) of any other various synthetic rubbers, in accordance with the use for conveyor belts and within a range not contradictory to the object of the present invention, in addition to the above-mentioned SBR, BR and natural rubber. The other synthetic rubber is preferably isoprene rubber, butyl rubber, halogenobutyl rubber, more preferably bromobutyl rubber, para-methylstyrene group-having butyl rubber (concretely, copolymer of isobutylene and p-halogenomethylstyrene, etc.), ethylene-propylene-diene rubber (EPDM), etc. A part of the natural rubber in the present invention may be substituted with isoprene rubber.

Silica of the component (B) is not specifically defined. Any of dry method silica and wet method silica are usable. Commercial products are also usable, and for example, there are mentioned Nipseal AQ (trade name: wet method silica by Tosoh Silica), etc.

The blending amount of silica is from 5 to 20 parts by mass relative to 100 parts by mass of the rubber component. This is because, when the blending amount of silica is more than 20 parts by mass, then the production workability lowers, and when less than 5 parts by mass, then the cutting resistance lowers and therefore the object of the present invention could not be satisfied.

The resin of the component (C) is not specifically defined. In consideration of the cutting resistance, the wear resistance and the production workability, preferred is use of rosin resins, dicyclopentadiene resins, petroleum hydrocarbon resins (both aliphatic and aromatic resins are usable), aromatic polycarboxylic acid-aliphatic polyalcohol condensates, simple substance of cumarone resins or their blends.

The blending amount of the resin is from 10 to 30 parts by mass relative to 100 parts by mass of the rubber component. This is because, when the blending amount of the resin is more than 30 parts by mass, then the wear resistance lowers, and when less than 10 parts by mass, then the cutting resistance lowers, and the object of the present invention could not be satisfied. From the same viewpoint, the blending amount of the resin is preferably from 15 to 30 parts by mass, more preferably from 15 to 25 parts by mass, relative to 100 parts by mass of the rubber component.

As the carbon black of the component (D), used here is carbon black of not lower than the level of ISAF grade, that is carbon black having a nitrogen adsorption specific surface area of 100 m$^2$/g or more. As the ISAF-grade carbon black, usable are ISAF (N220), for example, Asahi #80 (nitrogen adsorption specific surface area 115 m$^2$/g, DBP oil absorption (according to JIS K 6217-4:2001—the same shall apply hereinunder) 113 ml/100 g, by Asahi Carbon), and ISAF-HS (N234), for example, Sheast 7HM (nitrogen adsorption specific surface area 126 m²/g, DBP oil absorption 125 ml/100 g, by Tokai Carbon). Of those, preferred is high-structure carbon black, that is, ISAF-grade or higher carbon black having a DBP oil absorption of 120 ml/100 g or more.

The upper limit of the nitrogen adsorption specific surface area and the DBP oil absorption of carbon black are not specifically defined. Preferably, the nitrogen adsorption specific surface area is 150 m²/g or less, and the DBP oil absorption is 150 ml/100 g or less.

The blending amount of carbon black is from 40 to 70 parts by mass relative to 100 parts by mass of the rubber component. This is because when the blending amount of carbon black is more than 70 parts by mass, then the workability lowers, and when less than 40 parts by mass, then the wear resistance and the cutting resistance worsen, and the object of the present invention could not be satisfied.

In general, sulfur as a vulcanizing agent is incorporated in the rubber composition of the present invention. The blending amount of sulfur is preferably within a range of from 0.3 to 5 parts by mass relative to 100 parts by mass of the rubber component. When the blending amount of sulfur is less than 0.3 parts by mass, then a sufficient vulcanization effect could not be obtained and the intended performance could not be attained. When more than 5 parts by mass, then rubber would be brittle therefore providing some unfavorable results of rubber fatigue resistance degradation, etc.

In addition to the above-mentioned components, any other additives ordinarily used in the field of rubber industry can be incorporated in the rubber composition of the present invention in an ordinary blending amount. Concretely, there are mentioned a softening agent such as aroma oil, etc.; a vulcanization accelerator, for example, guanidines such as diphenylguanidine, etc., thiazoles such as mercaptobenzothiazole, etc., sulfenamides such as N-cyclohexyl-2-benzothiazolylsulfenamide, N,N'-dicyclohexyl-2-benzothiazolylsulfenamide, etc., thiurams such as tetramethylthiuram disulfide, etc.; a vulcanization accelerator aid such as zinc oxide, etc.; an antiaging agent, for example, amines such as poly(2,2,4-trimethyl-1,2-dihydroquinoline), phenyl-α-naphthylamine, N-(1,3-dimethylbutyl)-N'-phenyl-p-phenylenediamine, etc.

The rubber composition of the present invention can be obtained by kneading the components using a kneading machine such as an open-mixing type kneading roller, a closed-mixing type Banbury mixer or the like. With that, the obtained rubber composition is shaped into sheet using a calendar, an extruder or the like. The sheet-like rubber composition is applied to a core of a canvas cloth or a steel cord serving as a reinforcing material to cover and seal up the core, and then vulcanized to give a conveyor belt.

As described above, a conveyor belt generally comprises an upper cover rubber, a reinforcing material and a lower cover rubber, in which the upper cover rubber is brought into contact with the object to be conveyed. In the conveyor belt of the present invention that comprises an upper cover rubber, a reinforcing material and a lower cover rubber, the rubber composition of the present invention is used for the upper cover rubber. The reinforcing material and the lower cover rubber may be those heretofore known for belts of the type, but needless to say, the rubber composition of the present invention may be used for the lower cover rubber with no problem. The conveyor belt of the present invention is usable for heretofore-known conveyor belts. Specifically, the present invention also provides a conveyor belt equipped with a rubber belt formed from the rubber composition of the present invention, in place of the belt for conventionally-known conveyor belts.

EXAMPLES

The present invention is described in more detail with reference to the following Examples; however, the present invention is not limited at all by these Examples.

Here, evaluation methods are described below.
(Cutting Resistance: Falling-Weight Cut Test)

A rubber block having a size of 60 mm length×70 mm width×30 mm height was vulcanized to prepare a sample. At room temperature, a sharp knife edge having an angle of 60 degrees with a weight of 15 kg attached thereto was dropped from a height of 80 cm onto the sample, and the depth of the formed crack (mm) was measured. Samples having a smaller crack depth have better cutting resistance.
(Wear Resistance: DIN Wear Test)

Using a DIN wear resistance tester, a wear resistance test was carried out in accordance with JIS K 6264-2:2005. The wear resistance test was carried out at room temperature, and the depth of wear was expressed in terms of mm³. Samples having a smaller depth of wear have better wear resistance.
(Production Workability)

One kg of putty rubber was rolled with a 10-inch rolling machine (rolling temperature 60° C.) to have a thickness of 4 mm, whereupon the rolling workability was confirmed.

Samples with no specific problem were judged as good "O", and those that could not be wound around the roll or those that had adhered to the roll and could hardly be cut back were judged as bad "x".

Examples 1 to 15 and Comparative Examples 1 to 6

Rubber compositions were prepared according to the formulation shown in Table 1 and Table 2, and evaluated according to the falling-weight cut test and the DIN wear test and for the production workability. The results are shown in Table 1 and Table 2.

TABLE 1

| Components | | | Example | | | | | | | | | | | | | | |
|---|---|---|---|---|---|---|---|---|---|---|---|---|---|---|---|---|---|
| (part by mass) | | | 1 | 2 | 3 | 4 | 5 | 6 | 7 | 8 | 9 | 10 | 11 | 12 | 13 | 14 | 15 |
| (A) Rubber Component | SBR Mixture | SBR1 (styrene content 23.5%) | 50 | 50 | 50 | 50 | 50 | 50 | 50 | 50 | 50 | 50 | 50 | 70 | 55 | 40 | 50 |
| | | SBR2 (styrene content 46%) | 35 | 35 | 35 | 35 | 35 | 35 | 35 | 35 | 35 | 35 | 35 | 30 | 45 | 30 | |
| | | SBR3 (styrene content 37%) | | | | | | | | | | | | | | | 35 |
| | | Mean Styrene | 32.8 | 32.8 | 32.8 | 32.8 | 32.8 | 32.8 | 32.8 | 32.8 | 32.8 | 32.8 | 32.8 | 30.3 | 33.6 | 33.1 | 29.1 |

TABLE 1-continued

| Components (part by mass) | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | Content (%) | | | | | | | | | | | | | | | |
| | BR | 15 | | | 15 | 15 | 15 | 15 | 15 | 15 | 15 | 15 | | | 15 | 15 |
| | Natural Rubber | | 15 | 15 | | | | | | | | | 15 | 15 | | |
| (B) Silica | | 15 | 15 | 15 | 15 | 15 | 15 | 15 | 5 | 20 | 15 | 15 | 15 | 15 | 15 | 15 |
| (C) Resin | Resin 1: dicyclopentadiene | 10 | 10 | 10 | 10 | 20 | | | 10 | 10 | 10 | 10 | 10 | 10 | 10 | 10 |
| | Resin 2: rosin | 10 | 10 | | | | 20 | | 10 | 10 | 10 | 10 | 10 | 10 | 10 | 10 |
| | Resin 3: cumarone | | | | 10 | | | 20 | | | | | | | | |
| (D) Carbon Black | N234 | 50 | 50 | 50 | 50 | 50 | 50 | 50 | 50 | 50 | 40 | 70 | 50 | 50 | 50 | 50 |
| Antiaging Agent | RD | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 6C | 2 | 2 | 2 | 2 | 2 | 2 | 2 | 2 | 2 | 2 | 2 | 2 | 2 | 2 | 2 |
| Wax | | 2 | 2 | 2 | 2 | 2 | 2 | 2 | 2 | 2 | 2 | 2 | 2 | 2 | 2 | 2 |
| Vulcanizing Agent | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization Accelerator | CZ | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization Accelerator Aid | Zinc Flower | 5 | 5 | 5 | 5 | 5 | 5 | 5 | 5 | 5 | 5 | 5 | 5 | 5 | 5 | 5 |
| | Stearic Acid | 2 | 2 | 2 | 2 | 2 | 2 | 2 | 2 | 2 | 2 | 2 | 2 | 2 | 2 | 2 |
| Evaluation Results | Falling Weight Cut Test: depth of crack (mm) | 5.8 | 5.2 | 5.4 | 11.8 | 5.1 | 7.3 | 9.2 | 7 | 5.5 | 6.5 | 5.4 | 4.5 | 4.1 | 7.2 | 7.3 |
| | DIN Wear Test: depth of wear (mm$^3$) | 75 | 83 | 78 | 65 | 73 | 82 | 89 | 74 | 76 | 86 | 76 | 90 | 72 | 73 | 78 |
| | Production Workability | ○ | ○ | ○ | ○ | ○ | ○ | ○ | ○ | ○ | ○ | ○ | ○ | ○ | ○ | ○ |

TABLE 2

| Components (part by mass) | | | 1 | 2 | 3 | 4 | 5 | 6 |
|---|---|---|---|---|---|---|---|---|
| (A) Rubber Component | SBR Mixture | SBR1 (styrene content 23.5%) | 30 | 50 | 50 | 50 | 50 | 75 |
| | | SBR2 (styrene content 46%) | 35 | 35 | 35 | 35 | 35 | 10 |
| | | SBR3 (styrene content 37%) | | | | | | |
| | | Mean Styrene Content (%) | 35.6 | 32.8 | 32.8 | 32.8 | 32.8 | 26.1 |
| | BR | | 35 | 15 | 15 | 15 | 15 | 15 |
| | Natural Rubber | | | | | | | |
| (B) Silica | | | 15 | 3 | 25 | 15 | 15 | 15 |
| (C) Resin | Resin 1: dicyclopentadiene | | 10 | 10 | 10 | 5 | 15 | 10 |
| | Resin 2: rosin | | 10 | 10 | 10 | 3 | 15 | 10 |
| | Resin 3: cumarone | | | | | | | |
| (D) Carbon Black | N234 | | 50 | 50 | 50 | 50 | 50 | 50 |
| Antiaging Agent | RD | | 0.5 | 0.5 | 0.5 | 0.5 | 0.5 | 0.5 |
| | 6C | | 2 | 2 | 2 | 2 | 2 | 2 |
| Wax | | | 2 | 2 | 2 | 2 | 2 | 2 |
| Vulcanizing Agent | Sulfur | | 1.5 | 1.5 | 1.5 | 1.5 | 1.5 | 1.5 |
| Vulcanization Accelerator | CZ | | 1.5 | 1.5 | 1.5 | 1.5 | 1.5 | 1.5 |
| Vulcanization Accelerator Aid | Zinc Flower | | 5 | 5 | 5 | 5 | 5 | 5 |
| | Stearic Acid | | 2 | 2 | 2 | 2 | 2 | 2 |
| Evaluation Results | Falling-Weight Cut Test: depth of crack (mm) | | 12.8 | 16.8 | 5.1 | 19.3 | 4.8 | 11.9 |
| | DIN Wear Test: depth of wear (mm$^3$) | | 70 | 88 | 110 | 72 | 105 | 80 |
| | Production Workability | | ○ | ○ | X | ○ | X | ○ |

The components used in the compositions in Table 1 and Table 2 are described below.

SBR1: JSR 1500 (by JSR/styrene content 23.5% by mass)
SBR2: JSR 0202 (by JSR/styrene content 46.0% by mass)
SBR3: JSR 0122 (by JSR/styrene content 37.0% by mass)
BR: T0700 (by JSR/neodymium catalyst BR, co-catalyst: methylaluminoxane)
Natural Rubber: BR01 (by JSR)
Silica: Nipseal AQ (by Tosoh Silica)
Resin 1: Quintone 1920 (by Nippon Zeon/dicyclopentadiene-styrene petroleum resin C4-5 hydrocarbon copolymer)
Resin 2: High Rosin S (by Taisha Pine Essential Oil/rosin)
Resin 3: Esukuron V-120 (by Ouchi Shinko Chemical/cumarone resin)
Carbon Black N234: Sheast 7HM (by Tokai Carbon/nitrogen adsorption specific surface area 126 m$^2$/g, DBP oil absorption 125 ml/100 g)
Antiaging Agent RD: poly(2,2,4-trimethyl-1,2-dihydroquinoline) (by Ouchi Shinko Chemical, "Noclac 224")

Antiaging Agent 6C: N-(1,3-dimehtylbutyl)-N'-phenyl-p-phenylenediamine (by Sumitomo Chemical, "ANTIGENE 6C")

Vulcanization Accelerator CZ: N-cyclohexyl-2-benzothiazolylsulfenamide (by Ouchi Shinko Chemical, "Nocceler CZ")

As obvious from Table 1, the rubber compositions of Examples satisfy both cutting resistance and production workability without worsening the wear resistance thereof.

On the other hand, the following can be seen from Table 2. With respect to Comparative Example 1 in which the styrene content in the SBR mixture and the blending amount of the mixture in the rubber component are outside the defined ranges, the cutting resistance is poor. With respect to Comparative Example 2 in which the blending amount of silica is small, the cutting resistance is poor; and with respect to Comparative Example 3 in which the blending amount of silica is large, the wear resistance is low and the production workability is bad. With respect to Comparative Example 4 in which the blending amount of resin is small, the cutting resistance is poor; and with respect to Comparative Example 5 in which the blending amount of resin is large, the wear resistance is poor and the production workability is bad. With respect to Comparative Example 6 in which the styrene content in the SBR mixture is small, the cutting resistance is poor.

INDUSTRIAL APPLICABILITY

The rubber composition for conveyor belts of the present invention satisfies both cutting resistance and production workability without worsening the wear resistance thereof, and is favorably used for conveyor belts and the like, especially for conveyor belt covers.

The invention claimed is:

1. A rubber composition for conveyor belts, which contains, relative to (A) 100 parts by mass of a rubber component therein containing from 100 to 70 parts by mass of styrene-butadiene rubber and from 0 to 30 parts by mass of at least one selected from butadiene rubber and natural rubber, (B) from 5 to 20 parts by mass of silica, (C) from 10 to 25 parts by mass of resin, and (D) from 40 to 70 parts by mass of carbon black having a nitrogen adsorption specific surface area, which is measured according to JIS K 6217-2:2001, of 100 m$^2$/g or more, and wherein the styrene-butadiene rubber is a styrene-butadiene rubber mixture having a mean styrene content of from 28 to 35% by mass, which contains one or more types of styrene-butadiene rubber having a styrene content of from 20 to 25% by mass and one or more types of styrene-butadiene rubber having a styrene content of from more than 25 to 50% by mass.

2. The rubber composition for conveyor belts according to claim 1, wherein the styrene-butadiene rubber mixture contains from 40 to 70% by mass of styrene-butadiene rubber having a styrene content of from 20 to 25% by mass and from 30 to 60% by mass of styrene-butadiene rubber having a styrene content of from more than 25 to 50% by mass.

3. A rubber for conveyor belt covers, formed by using the rubber composition of claim 1.

4. A conveyor belt provided by using the rubber composition of claim 1.

5. A rubber for conveyor belt covers, formed by using the rubber composition of claim 1.

6. A conveyor belt provided by using the rubber composition of claim 2.

7. The rubber composition for conveyor belt according to claim 1, wherein the resin is at least one selected from the group consisting of rosin resins, dicyclopentadiene resins, petroleum hydrocarbon resins, aromatic polycarboxylic acid-aliphatic polyalcohol condensates, and simple substance of cumarone resins or their blends.

8. The rubber composition for conveyor belt according to claim 1, wherein the styrene-butadiene rubber is a styrene-butadiene rubber mixture having a mean styrene content of from 28 to 35% by mass, which contains one or more types of styrene-butadiene rubber having a styrene content of from 22 to 25% by mass and one or more types of styrene-butadiene rubber having a styrene content of from more than 30 to 50% by mass.

9. The rubber composition for conveyor belt according to claim 1, wherein the styrene-butadiene rubber is a styrene-butadiene rubber mixture having a mean styrene content of from 30 to 35% by mass, which contains one or more types of styrene-butadiene rubber having a styrene content of from 22 to 25% by mass and one or more types of styrene-butadiene rubber having a styrene content of from more than 40 to 50% by mass.

10. The rubber composition for conveyor belt according to claim 7, wherein the resin is petroleum hydrocarbon resins.

11. The rubber composition for conveyor belt according to claim 10, wherein the petroleum hydrocarbon resins is at least one selected from aliphatic and aromatic petroleum hydrocarbon resins.

* * * * *